United States Patent [19]
Jureit et al.

[11] 3,871,213
[45] Mar. 18, 1975

[54] TEST STAND FOR TRUSSES

[76] Inventors: John Calvin Jureit, 8901 Arvida Ln., Coral Gables, Fla. 33156; Adolfo Castillo, 7761 S.W. 18th Ter., Miami, Fla. 33155; Carlos Rionda, 11120 S.W. 50th Ter., Miami, Fla. 33165

[22] Filed: Jan. 7, 1974

[21] Appl. No.: 431,068

[52] U.S. Cl. ............................ 73/94, 73/100, 73/103
[51] Int. Cl. ............................................. G01n 3/08
[58] Field of Search ................ 73/94, 103, 100, 88 R

[56] References Cited
UNITED STATES PATENTS
1,147,153  7/1915  Emery .................................. 73/100
3,512,404  5/1970  Jureit .................................. 73/88 R Primary Examiner—Jerry W. Myracle
Attorney, Agent, or Firm—LeBlanc & Shur

[57] ABSTRACT

The test stand includes an elongated base mounting plural pairs of uprights at longitudinally spaced positions along the base. Each upright carries an air cylinder pivotally mounting a downwardly directed platen. The platens on the respective sides of the uprights engage the upper chords of a pair of trusses to be tested, each truss resting at its ends on load cells or blocks. Air is supplied to the cylinders through a regulator and one or both of the trusses are loaded to specifications. The air cylinders are adjustable along their uprights to permit test of various types of trusses, i.e., mono-pitch, bowstring, flat and pitched truss configurations.

9 Claims, 3 Drawing Figures

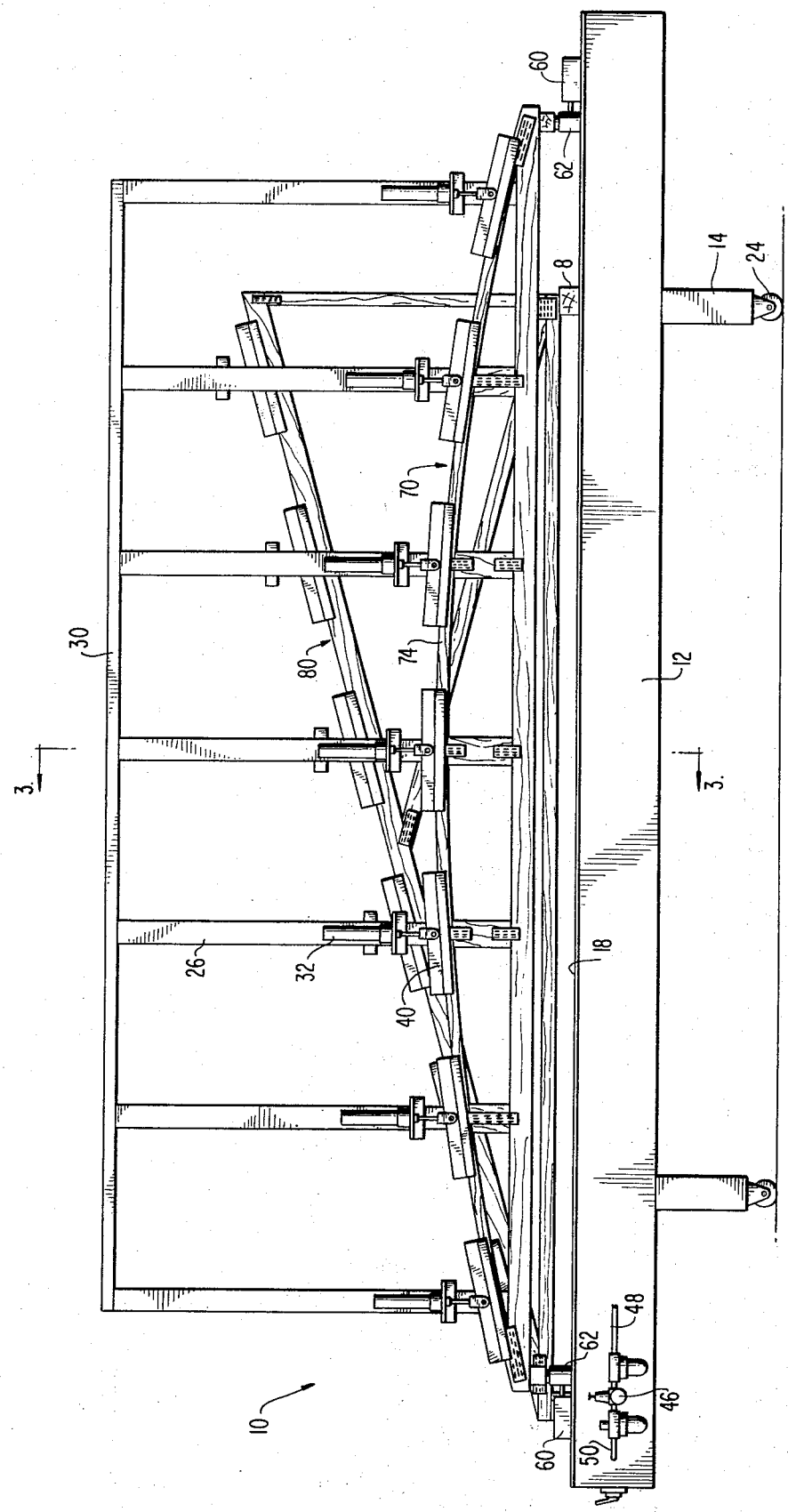

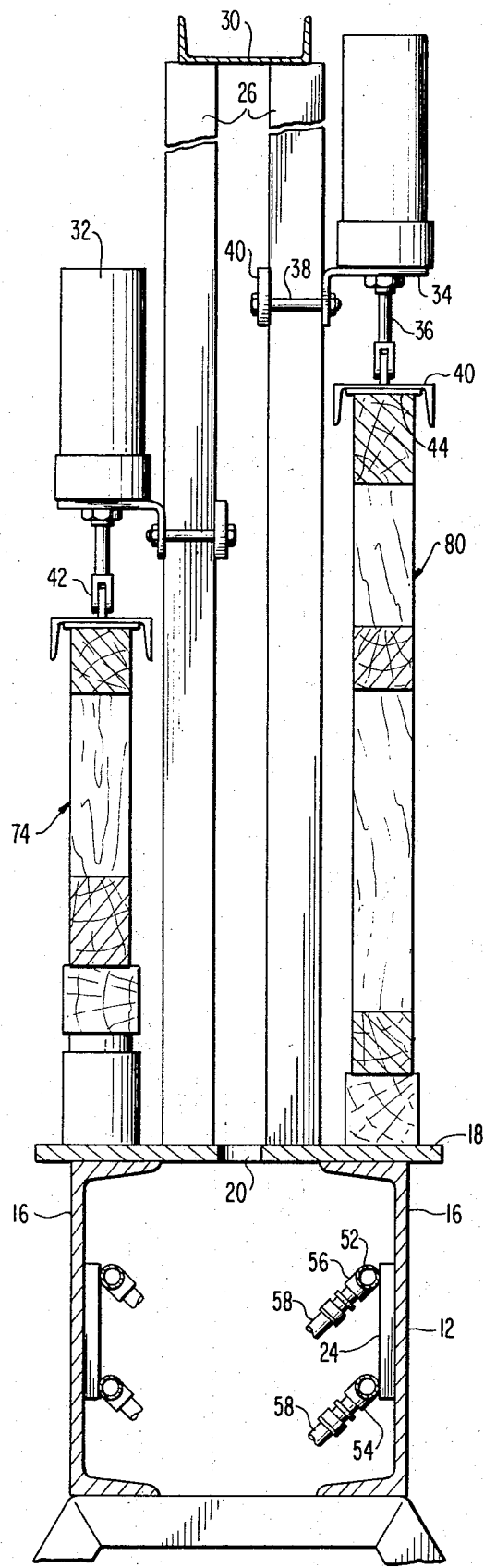
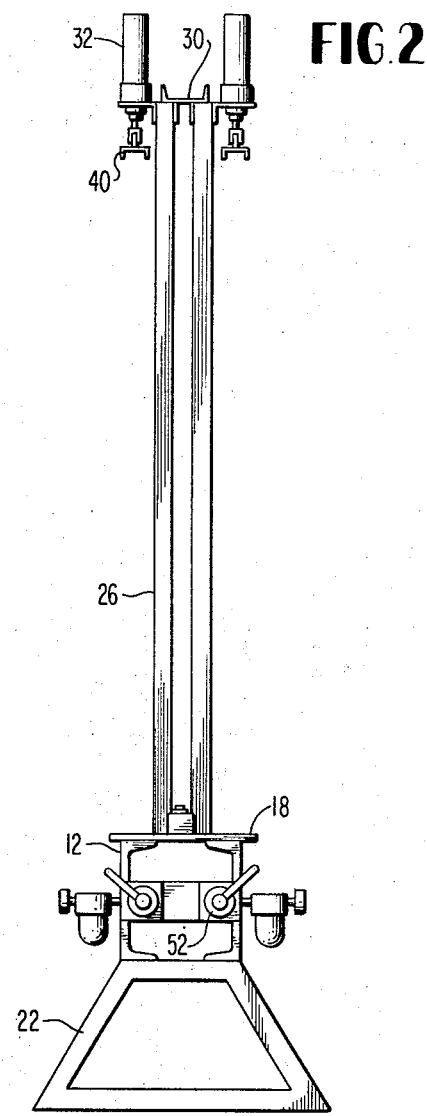

TEST STAND FOR TRUSSES

The present invention relates to a test stand for use in testing wooden frames, panels and the like and particularly relates to a test stand for testing various types of wooden trusses.

In the wooden building industry, it is common practise for fabricators to mass produce wooden trusses on an assembly line basis. These trusses may be of a wide variety of types and shapes for a particular construction project. As background, generally such trusses are formed by prepositioning precut wooden members on a jig and embedding the teeth of connector plates spotted on each of the opposite sides of the joints into the wooden members forming the joints. Such automated truss fabrication techniques are, to a significant extent, now standard in the industry. An example of the foregoing described system is disclosed in U.S. Pat. No. 3,603,244, of common assignee herewith.

As in all automated systems, control of the quality of the final product is necessary. Accordingly, mass produced trusses, for example those fabricated as disclosed in the above noted U.S. patent, are usually tested utilizing random sampling techniques. In this manner, the quality of the trusses fabricated is maintained. This testing procedure requires the periodic test of one or more like configured trusses. For example, a fabricator may test two trusses of every configuration produced every two days in order to maintain his quality control sampling within acceptable limits. Obviously, a quality control testing program of this magnitude requires substantial expenditure of time, labor, space, etc.

Prior test procedures have often been very cumbersome in nature, inaccurate in result, and are generally characterized by other disadvantages. For example, one prior method of testing trusses required a pair of like trusses to be set up with concrete or steel weights applied. Most such tests utilized plywood to span the trusses. Concrete blocks were then loaded on the plywood to load the trusses. For example, the loading units are usually 30–40 pounds each and it would require placement of approximately 50 or more of these loading units to apply a minimum superimposed load on the smallest trusses. Obviously this procedure required a great deal of manual labor and care to prevent accidents due to falling blocks, etc. Long span trusses were particularly difficult to test under these procedures. Also, deflection measurements taken from dial indicators require a level reference point in order to yield proper readings. This was not always available at the fabrication site. Still further, such tests required substantial space not always available for the loading and unloading procedures. Consequently a great amount of time, effort and heavy labor was involved in prior testing.

A further example of a prior truss testing method is illustrated in U.S. Pat. No. 3,512,404 also of common assignee herewith. In that patent, trusses are tested directly on the jig table prior to their removal therefrom. This, however, interrupts the production line to a substantial extent and effectively shuts down the assembly line for the time required to conduct the test.

The present invention provides a test stand for wooden trusses, panels and the like which eliminates or minimizes the foregoing and other problems associated with prior apparatus for testing wooden trusses and provides a novel and improved test stand for wooden trusses having various advantages in construction, mode of operation and use in comparison with such prior wooden truss testing apparatus. For example, the present invention provides a test stand which is easy to set up and operate, which minimizes the time required for the test, and which is accurate and safe. Moreover, the test stand can be operated simply by turning a valve thus eliminating the heavy manual labor previously required in certain prior test apparatus and procedures. Particularly, the present test stand includes an elongated base carrying plural pairs of uprights at longitudinally spaced positions along the base. Each upright mounts a fluid actuated cylinder at a slidably adjusted position therealong whereby the height of a platen, pivotally carried by the cylinders' piston, can be adjusted in elevation relative to the test stand. The fluid actuated cylinders are arranged in pairs on opposite sides of the uprights whereby the longitudinally spaced cylinders aligned on each of the opposite sides of the uprights are utilized for testing a truss disposed on the base and on that side of the test stand. Load cells are preferably positioned on opposite ends of the base and fluid is supplied to the cylinders on each side of the test stand through a regulator whereby loadings of a predetermined value can be placed on the truss and such loadings verified. Also, the base provides a reference point for deflection readings which may be taken utilizing standard type dial indicators.

In setting up for a test, a truss, taken as a random sample from the mass produced trusses, is disposed on the base with the opposite ends of the truss on the load cells or on blocks if the load cells are not utilized. The fluid actuated cylinders are adjusted in elevation along the uprights and the platens are engaged along the upper chord of the truss. A significant feature hereof resides in the pivotal mounting of the platens on the fluid actuated cylinders whereby trusses of various configurations, i.e., mono-pitch, bowstring, pitched, etc., can be tested. A truss of a different or like type may also be mounted on the opposite side of the test stand as desired. The truss is loaded by valving fluid to the cylinders until the test load is obtained. Deflection readings can be taken utilizing the base of the test stand as a reference point for the readings and the load applied to the truss can be checked by reading the load cells at opposite ends of the stand. Once the test is complete and the truss has been inspected, the pistons are retracted and the truss is removed from the stand. It will be appreciated that two trusses of like or unlike type can be tested independently of one another and that such tests may be conducted simultaneously or successively as desired.

Accordingly, it is the primary object of the present invention to provide a novel and improved test stand for wooden trusses, panels and the like.

It is another object of the present invention to provide a novel and improved test stand for wooden trusses, panels and the like which is easy to set up and operate, fast, accurate, safe in operation and operable simply by opening and closing a valve.

It is still another object of the present invention to provide a novel and improved test stand for wooden trusses and the like requiring minimum space and set-up time for its full utilization.

It is a further object of the present invention to provide a novel and improved test stand for wooden trusses and the like wherein the stand per se serves as a reference point for deflection readings, as a point of support for the trusses and as a support for load cells, whereby the actual loadings on the trusses can be determined.

It is a still further object of the present invention to provide a novel and improved test stand for wooden trusses, panels and the like for accurately testing trusses of various types, i.e., mono-pitch, bowstring, pitched, etc., with only nominal and readily and easily made changes in the test apparatus.

It is a related object of the present invention to provide a novel and improved test stand for wooden trusses and the like which may be disposed on wheels and hence rendered mobile, which may simultaneously test two trusses of completely different or like types as desired, which may be used to apply impact loads on the trusses and, where a plurality of test stands are provided, may be used end to end to test longer span trusses.

These and further objects and advantages of the present invention will become more apparent upon reference to the following specification, appended claims and drawings wherein:

FIG. 1 is a side elevation view of a test stand constructed in accordance with the present invention and illustrated in position for testing a bowstring truss on one side and a mono-pitched truss on its opposite side;

FIG. 2 is an end elevational view thereof; and

FIG. 3 is an enlarged cross-sectional view thereof taken generally about on line 3—3 in FIG. 1.

Referring now to the drawings, particularly to FIG. 1, there is illustrated a test stand generally designated 10 constructed in accordance with the present invention and comprising a base 12 mounted on depending legs 14. Particularly, base 12 includes a pair of elongated channels 16 (FIG. 3) disposed in laterally spaced relation and secured one to the other by a top plate 18. Top plate 18 has a plurality of openings 20 at longitudinally spaced locations along its centerline for reasons described hereinafter. Each of the legs 14 comprises a generally trapezoidal framework 22 (FIG. 2) secured to the lower edges of channels 16 with each framework mounting a pair of wheels or rollers 24 whereby the test stand is rendered mobile. For reasons noted hereinafter, a plurality of pipe or fluid conduit supports 24 are secured at longitudinally spaced positions along the inner surfaces of side channels 16.

Plural pairs of uprights 26 are secured to the top plate 18 at longitudinally spaced positions along base 12. Each upright comprises a generally square tube. The transversely aligned uprights 26 are spaced one from the other and on opposite sides of the openings 20. A tie channel 30 secures the transversely opposed uprights one to the other and to longitudinally spaced pairs of uprights thereby forming a rigid support structure upstanding from base 12.

A fluid actuated, preferably pneumatic, cylinder 32 is adjustably mounted on each of the uprights 26 whereby each upright can be located at selected elevations therealong and relative to the top plate 18 of base 12. A flange of a right angle bracket 34 is secured to the end of each air cylinder from which its piston 36 projects. The other flange of bracket 34 is provided with a pair of spaced openings for receiving bolts 38 also received through a clamp flat 40 on the inner side of the corresponding upright 26. Bolts 38, of course, straddle the corresponding upright. It will be appreciated that by loosening bolts 38, the corresponding cylinder 32 may be raised or lowered along its supporting upright 26 and that the bolts may be tightened to clamp the cylinder 32 to the upright at the desired elevation of the cylinder. A platen 40, preferably in the form of an inverted channel, is pivotally secured to the end of piston rod 36 by a pin and clevis arrangement generally designated 42. A bearing plate 44 is secured along the base of platen 40 for engagement with the upper chord of the truss subject to test in a manner described below.

For each set of air cylinders on one side of the test stand, there is provided an air regulator 46 (FIG. 1) which connects with a source of air under pressure, not shown, via a conduit 48. A conduit 50 connects regulator 46 with a rotary air valve 52. Rotary air valve 52 has a pair of connections for respectively providing air to the cylinders on one side of their pistons and receiving air from the opposite sides of their pistons. Particularly such connections are coupled to brackets 24 secured along the inside of each channel 12. By means of T-type connections 56, hoses 58 connect conduits 52 and 54 to the respective upper and lower ends of cylinders 32, it being appreciated that the conduits 58 extend through openings 20 and upwardly between the transversely spaced uprights for connection with the air cylinders 32. Similar valving and piping arrangements are provided for the cylinders located on the opposite side of the test stand and it will thus be appreciated that the sets of cylinders are independently operable.

At each of the opposite ends of base 12, there is provided a load cell 60. The load cell 60 is coupled to a bearing 62 for supporting the ends of a truss disposed on the truss stand. A pair of load cells are preferably provided on each end whereby the load cells may serve both sides of the test stand when two trusses are tested simultaneously.

In use, a truss, for example the bowstring truss generally designated 70 in FIG. 1, is disposed on the test stand with its ends on the bearing supports 62. The air cylinders are adjusted vertically such that platens 40 engage the upper chord 74 of the bowstring truss. It will be appreciated that the particular angle at which the upper chord extends at any cylinder location is accommodated by the pivoted platen 40. Once the air cylinders have been adjusted vertically and secured to the corresponding uprights 26, the valve 52 is opened to extend the pistons and platens carried thereby whereby a load is applied to the bowstring truss 70. For example, 100 pounds p.s.i. air pressure may be provided to the seven cylinders to provide a total load on the bowstring truss of 3,500 pounds. The load cells 60 at opposite ends of the truss can be checked to determine the actual load applied. Also, the deflection of the bowstring truss under the applied loading can be measured by one or more conventional dial indicators, not shown, utilizing the top plate 18 of base 12 as a reference point at any longitudinal position along the truss.

Simultaneously therewith or successively, as desired, the other side of the test stand can be utilized to test a like of different type of truss. For example, in FIG. 1 there is disclosed a mono-pitch type truss 80 disposed on the opposite side of the test stand. The air cylinders 32 on that side are similarly adjusted in height such that the platens 40 carried thereby engage the upper chord of the illustrated mono-pitch truss. It will be appreciated that load cells 60 need not be utilized and that the truss on either side can be disposed on blocks, for example blocks 8 illustrated in FIG. 1 supporting truss 80. The air cylinders engaging the mono-pitch truss can be actuated similarly to apply a loading to the mono-pitch truss thereby effectively testing the truss. Note that the air cylinders do not apply a loading to the floor or ground of the test stand and this permits the stand to be mobile and mounted on wheels 24 whereby it can be disposed in an out-of-the-way position when not in use.

Also, it will be appreciated that all seven cylinders illustrated need not be utilized when testing a particular type truss. For example, if the truss does not have a span sufficient to underlie the seven cylinders, a fewer number of the cylinders may be utilized to conduct the test. Also, where longer trusses than the longitudinal extent of the test stand are to be tested, two test stands of the type described herein can be disposed in end-to-end relation one to the other. Also, a greater or lesser number of air cylinders can be provided than as illustrated.

Further, the test stand hereof may be used to apply impact loads to the trusses. By increasing the air pressure to the desired reading and rotating the air valve, an impact load can be applied to the truss. Also, adjustably mounting the cylinders on the uprights, it will be appreciated that trusses of various types, for example mono-pitch, bowstring, flat, etc. can be tested and that the capability to test a particular truss is independent of the truss shape.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A test stand for a truss comprising: an elongated, generally horizontally extending base, means carried by said base for supporting first and second generally vertically disposed trusses, a plurality of fluid actuated cylinders carried by said test stand including first and second sets thereof generally overlying said base at longitudinally spaced positions therealong, each said set thereof lying in a generally vertical plane extending parallel to said base with said sets lying adjacent opposite sides of said test stand, each of the cylinders of said first set thereof having a head engageable with the upper chord of the first truss supported by said base and at longitudinally spaced positions therealong, means for supplying fluid under pressure to the cylinders of said first set thereof for loading the first truss, each of the cylinders of the second set thereof having a head engageable with the upper chord of the second truss supported by said base and at longitudinally spaced positions therealong, and means for supplying fluid under pressure to the second set of cylinders for loading the second truss.

2. A test stand according to claim 1 including support structure upstanding from said base, and means for connecting said cylinders to said support structure at selected elevations above said base on opposite sides of said test stand whereby the distance between each of said heads and said base is selectively adjustable to accommodate trusses having varying heights along their lengths and on each of the opposite sides of said test stand.

3. A test stand according to claim 2 wherein said support structure includes plural pairs of uprights upstanding from said base at longitudinally spaced positions therealong, said first and second sets of cylinders being connected to the uprights adjacent opposite sides of said test stand, said cylinder connecting means including clamps for releasably clamping said cylinders to said uprights at vertically adjustable positions therealong.

4. A test stand according to claim 3 wherein said fluid supply means includes conduits coupling the cylinders of each set thereof in parallel one to the other whereby said sets of cylinders are independently operable for testing like or unlike trusses on opposite sides of said test stand.

5. A test stand for a truss comprising: an elongated generally horizontally extending base, means upstanding from said base for supporting a generally vertically disposed truss, a plurality of fluid actuated cylinders carried by said truss stand and generally overlying said base at longitudinally spaced positions therealong, each of said cylinders having a head engageable with the upper chord of the truss supported by said base and at longitudinally spaced positions therealong, means carried by said head for maintaining the truss in a vertical position supported by said base, said head being pivotally secured to said cylinders for rotation about axes normal to a plane containing said elongated base and the truss and means for connecting the cylinders to said support structure at selected and different elevations above said base whereby the distance between each of said heads and said base is selectively adjustable to accommodate trusses having varying heights along their lengths.

6. A test stand according to claim 5 wherein said support structure includes a plurality of uprights upstanding from said base at longitudinally spaced positions therealong, said cylinder connecting means including clamps for releasably clamping said cylinders to said uprights at vertically adjustable positions therealong.

7. A test stand according to claim 5 including a plurality of wheels carried by said base structure for rendering said test stand mobile.

8. A test stand according to claim 5 including a sensing device carried by said base for measuring a load bearing characteristic of the truss.

9. A test stand according to claim 5 including fluid conduits coupling said cylinders one to the other in parallel.

* * * * *